April 12, 1927.
J. D. HILLIARD
POWER SYSTEM
Filed Oct. 24, 1923
1,624,729
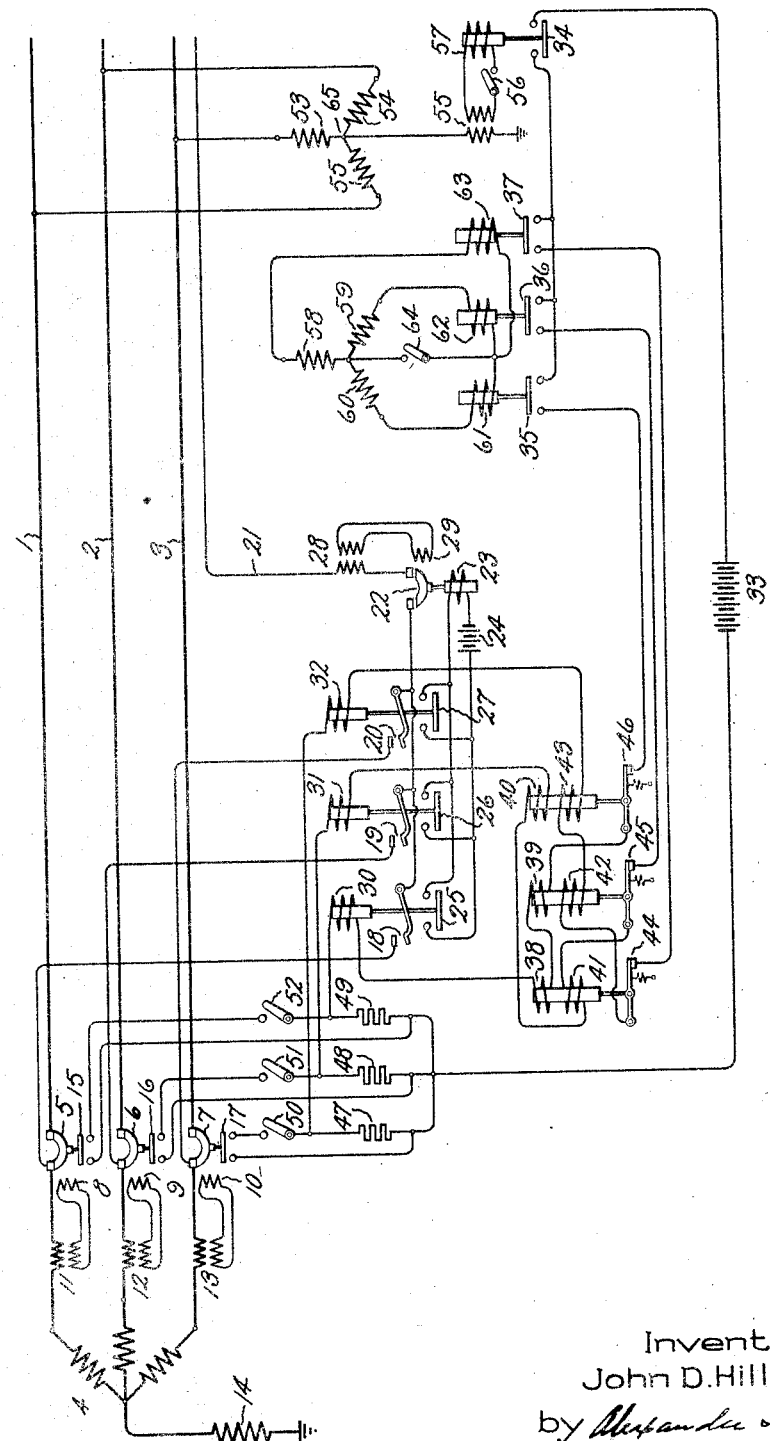
Inventor:
John D. Hilliard,
by Alexander S. Lane
His Attorney.

Patented Apr. 12, 1927.

1,624,729

UNITED STATES PATENT OFFICE.

JOHN D. HILLIARD, OF SCHENECTADY, NEW YORK, ASSIGNOR TO GENERAL ELECTRIC COMPANY, A CORPORATION OF NEW YORK.

POWER SYSTEM.

Application filed October 24, 1923. Serial No. 670,617.

My invention relates to power systems, and particularly to the provision of means responsive to a fault on a transmission or distribution line for automatically cutting out the line conductor on which a fault has occurred and substituting therefor a sound conductor.

In the operation of transmission or distribution systems it is frequently of the utmost importance that periods of interrupted service due to failure of a line conductor be reduced to a minimum or entirely avoided. In accordance with my invention, means operable in response to the grounding of an alternating current line conductor and controlled by operation of the switch by which the faulty conductor is disconnected from the system are provided for automatically connecting a spare conductor in place of the disconnected conductor. By this arrangement continuity of service is maintained and a sound conductor is immediately substituted for the one which has became faulty.

My invention will be better understood on reference to the following description when considered in connection with the accompanying drawings and its scope will be pointed out in the appended claims.

Referring now to the drawing, there is shown in the single figure thereof a polyphase power line comprising conductors 1, 2 and 3 arranged to be supplied with current from the transformer secondary winding 4 through line switches 5, 6 and 7 arranged to be operated by overload relay coils 8, 9 and 10 respectively connected to the secondary windings of current transformers 11, 12 and 13. The neutral point of the winding 4 is connected to ground through an impedance device 14.

The main line switches 5, 6 and 7 are provided with interlocks 15, 16 and 17 respectively arranged to prevent operation of the auxiliary switches 18, 19 and 20 until the corresponding main line switch has opened. The auxiliary switches 18, 19 and 20 are provided for controlling the connection to the system of the spare line 21 in place of one of the main lines which has become faulty and are provided with interlocks 25, 26 and 27 through which a source of current 24 is connected to the closing coil 23 of the spare line switch 22. A current transformer 28 having its primary winding connected in series with the spare line 21 is provided for operating the trip coil 29 of the spare line switch 22 in case of overload.

The operating coils 30, 31 and 32 of the auxiliary switches 18, 19 and 20 respectively are arranged to be energized by the battery 33 in response to closure of switch 34, closure of the corresponding switch 35, 36 or 37, and opening of the corresponding main switch 5, 6, or 7. Also arranged to be connected to the battery 33 through switch 34 and a corresponding switch 35, 36 or 37 are the operating coils 38 to 43 inclusive of the spare line selector switches 44, 45 and 46. The spare line selector switches 44, 45 and 46 are arranged to operate at a lower voltage than the auxiliary switches 25, 26 and 27 and the arrangement is such that, upon closure of switch 34 and one of the switches 35, 36 or 37, corresponding operating coils of the auxiliary and selector switches are connected in series with the battery 33 through a corresponding one of the resistors 47, 48 or 49. Thus, assuming the switches 34 and 37 to be closed and the connections to be otherwise as illustrated, the coils 42 and 43 of selector switches 45 and 46, and coil 32 of auxiliary switch 20 are connected in series with the resistor 47 across the battery 33. The resistance of the resistor 47 is of such magnitude as to permit the passage of enough current to operate the switches 45 and 46. The auxiliary switches 18, 19 and 20, however, are arranged to operate at a somewhat higher voltage than the selector switches 44, 45 and 46 to permit of a time delay trip being employed on the main line circuit breakers 5, 6 and 7, and the switch 20 will not be operated so long as the resistor 47 is connected in series with its operating coil 32. The resistors 48 and 49 are likewise related with the corresponding operating coils of auxiliary switches 25 and 26 respectively.

Switches 50, 51 and 52 are provided for rendering auxiliary switches 20, 19 and 18 respectively unresponsive to opening of the corresponding main switch 7, 6 or 5.

Connected to the polyphase line in star are the potential transformer primary windings 53, 54 and 55 having their neutral point 65 connected to ground through a potential transformer 55, the secondary winding of which is arranged to be connected through the switch 56 to the operating coil 57 of the switch 34. Inductively related to the primary windings 53, 54 and 55 respectively are the secondary windings 58, 59 and 60 which are provided for energizing the operating coils 61, 62 and 63 of the switches 35, 36 and 37 respectively. A switch 64 is provided for the purpose of controlling operation of the switches 35, 36 and 37.

Under normal operating conditions the phases 1, 2 and 3 of the power line are approximately balanced and the neutral point 65 of the potential transformer windings 53, 54 and 55 is at or near ground potential. Under these conditions, assuming the switches 56 and 64 to be closed, little or no current flows through the potential transformer 55, the coil 57 of the switch 34 is unenergized and the operating coils 61, 62 and 63 of the switches 35, 36 and 37 are energized to maintain the corresponding switches in the up or open position.

If the line 3 is grounded, current is fed into the ground from the other phases, the system is unbalanced, and the potential of neutral point 65 is raised with respect to the ground. Under these conditions current passes to the ground through transformer 55 and the coil 57 is energized to close the switch 34. At the same time the voltage induced in the secondary winding 58 is reduced, the current supplied to switch operating coil 63 is diminished and switch 37 is closed. Upon closure of switches 34 and 37 the operating coils 42 and 43 of selector switches 45 and 46 respectively and the operating coil 32 of auxiliary switch 20 are connected across the battery 33 in series with the resistor 47. The selector switches 45 and 46 thereupon open and line 3 is definitely selected as the line for which the spare line 21 is to be substituted. Subsequent closure of switch 35 or 36 cannot under these conditions effect the substitution of the spare line for conductors 1 or 2 because of the fact that auxiliary switches 45 and 46 are open. Assuming the switches 50, 51 and 52 to be closed, opening of the switch 7 due to grounding of the line 3 operates to short-circuit the resistor 47 through the interlock 17. The current supplied to the switch operating coils 42, 43, and 32 is thereupon increased and the switch 20 together with its interlock 27 is closed. By closure of the interlock 27 the battery 24 is connected to the closing coil 23 of the switch 22, and this switch is closed to connect in the spare line 21 independently of the switch 7. The manner in which the spare line 21 is substituted for either line 1 or line 2 will be apparent from what has been said in connection with the substitution of spare line 21 for line 3. It is of course obvious that the battery 24 may be dispensed with by arranging the interlocks 25, 26 and 27 to connect the switch operating coil 23 to the battery 33, or any other suitable source of current.

While the previous description has referred to but one end of a line section, it is apparent that a faulty conductor should be entirely disconnected from the system. For this purpose similar control means are provided at each end of the section. Under these conditions disconnection of the faulty line and connection of the spare conductor to the system is accomplished at both ends of the section at approximately the same time.

What I claim as new and desire to secure by Letters Patent of the United States, is:—

1. A system of the class described wherein a plurality of main conductors connected to different terminals of current supply means are each provided with means for disconnecting it from the system when it becomes faulty and wherein a spare conductor is arranged to be substituted for any one of said main conductors, characterized by the fact that selector means responsive to a fault on said conductors and to the operation of the disconnecting means of the faulty conductor are provided for controlling the connection of said spare conductor to the system in place of the faulty conductor.

2. A system of the class described wherein polyphase conductors arranged for the transmission of current are each provided with means for disconnecting it from the system when it becomes faulty and wherein a spare conductor is arranged to be substituted for any one of said polyphase conductors, comprising means responsive to the operation of said disconnecting means for controlling the connection of said spare line conductor to said system, and selector means responsive to a fault on said system for controlling the operation of said controlling means.

3. A system of the class described wherein polyphase conductors arranged for the transmission of electricity are each provided with means for disconnecting it from the system when it becomes faulty and wherein a spare conductor is arranged to be substituted for any one of said polyphase conductors, comprising a switch for connecting said spare line to said system, means responsive to the operation of said disconnecting means for controlling the operation of said switch, and selector means responsive to a fault on said system for controlling the operation of said switch controlling means.

4. A system of the class described wherein polyphase conductors arranged for the transmission of electricity are each provided with means for disconnecting it from the system when it becomes faulty and wherein a spare conductor is arranged to be substituted for any one of said polyphase conductors, comprising means responsive to the operation of said disconnecting means for controlling the connection of said spare line to said system, selector means for controlling the operation of said connection control means, and means including a potential transformer for controlling the operation of said selector means in response to a fault on said system.

5. A system of the class described wherein a plurality of conductors arranged for the transmission of electricity are each provided with means for disconnecting it from the system when it becomes faulty and wherein a spare conductor is arranged to be substituted for said faulty conductor, comprising a switch for connecting said spare line to said system, means for controlling the operation of said switch, selector means for controlling the operation of said switch controlling means, a source of current for operating said selector and switch control means, a resistor, means responsive to a fault on said system for connecting operating coils of said selector and switch control means in series with said resistor across said source of current, and means associated with said disconnecting means for short-circuiting said resistor.

6. A system of the class described wherein a plurality of conductors arranged for the transmission of electricity are each provided with means for disconnecting it from the system when it becomes faulty and wherein a spare conductor is arranged to be substituted for said faulty conductor, comprising means for controlling the connection of said spare line to said system, selector means for controlling the operation of said connection control means, a source of current for operating said selector and connection control means, a potential transformer arranged to respond to a fault on said system, means controlled by said potential transformer for operatively associating said selector means with said source of current, and means responsive to operation of said disconnecting means for operatively associating said connection control means with said source of current.

7. A system of the class described wherein a plurality of conductors arranged for the transmission of electricity are each provided with means for disconnecting it from the system when it becomes faulty and wherein a spare conductor is arranged to be substituted for said faulty conductor, comprising means for controlling the connection of said spare line to said system, selector means for controlling the operation of said connection control means, means for operating said selector and connection control means, potential transformers having their primary windings connected between said conductors and a common point and their secondary windings each connected across the operating coil of a switch, a switch having its operating coil connected between said common point and ground and arranged to cooperate with said switches for operatively associating said operating means with said selector means, and means responsive to operation of said disconnecting means for operatively associating said connection control means with said operating means.

In witness whereof, I have hereunto set my hand this 23rd day of October 1923.

JOHN D. HILLIARD.